March 5, 1935.  W. A. STROUD  1,993,024
DRINK MIXER
Filed Aug. 5, 1932   2 Sheets-Sheet 1

INVENTOR:
WILLIAM A. STROUD
BY
Paul S Eaton
ATTORNEY.

March 5, 1935.  W. A. STROUD  1,993,024

DRINK MIXER

Filed Aug. 5, 1932  2 Sheets-Sheet 2

WILLIAM A. STROUD
INVENTOR.

BY
*Paul B Eaton*
ATTORNEY.

Patented Mar. 5, 1935

1,993,024

UNITED STATES PATENT OFFICE 1,993,024

DRINK MIXER

William A. Stroud, Wilkesboro, N. C.

Application August 5, 1932, Serial No. 627,651

4 Claims. (Cl. 259—93)

This invention relates to a drink mixer in which means are provided for raising and lowering the container for the drink during the mixing operation. And it relates more specifically to means for holding the container with the drink therein and having manually operated means for starting the motor in operation, whereby the container with the drink therein is automatically raised a predetermined height and is automatically reversed in movement until the container is moved to lowered position at which time the container holder automatically opens the circuit to the motor driving the agitator of the drink mixer whereby the agitator is automatically stopped.

Some of the objects of the invention having been stated, other objects will appear as the description proceeds when taken in connection with the accompanying drawings, in which—

Figure 4:
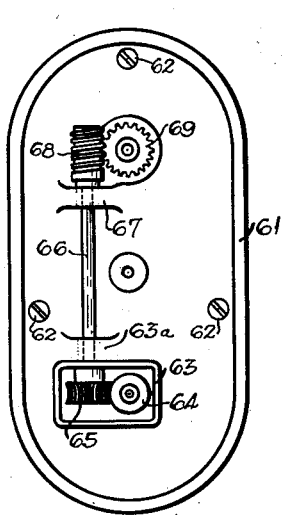
Figure 4 is a plan view of the device.
Figure 5:
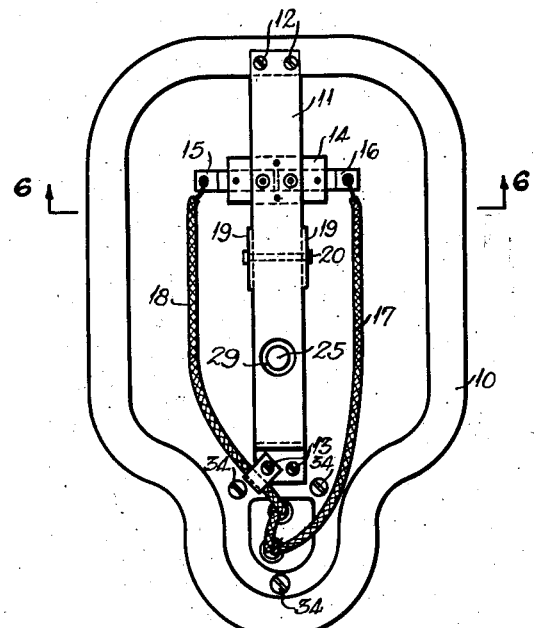
Figure 5 is a bottom plan view of the device.
Figure 6:
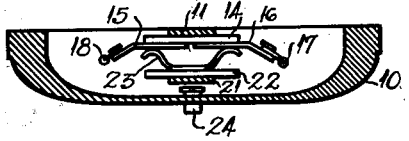
Figure 6 is a transverse sectional view taken along the line 6—6 in Figure 5, and showing the mechanism in inverted position from that shown in Figure 1.
Figure 1:
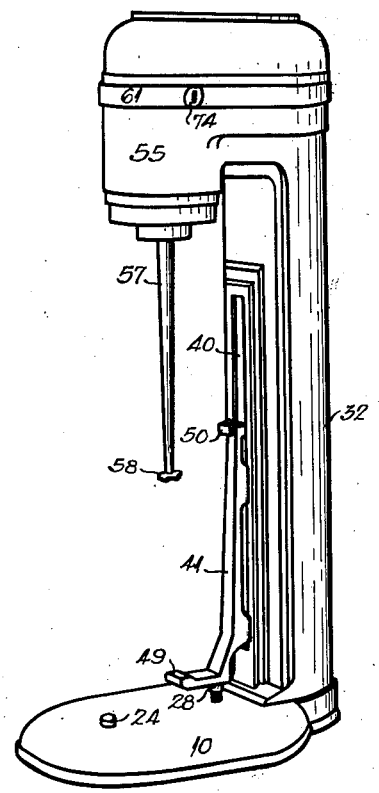
Figure 1 is an isometric view of the drink mixer.

Referring more particularly to the drawings, the numeral 10 indicates the base portion of the drink mixer which has a plate 11 secured thereto by any suitable means such as screws 12 and 13. This plate has an insulating block 14 mounted thereon on which are mounted two separate metallic conducting members 15 and 16 to which are connected on opposed sides a circuit in the form of wires 17 and 18. Plate 11 has an upstanding portion 19 on which is pivotally mounted as at 20 a metallic member 21 having an insulating member 22 secured thereon with a double contact member 23 secured on the lower side and being adapted to bridge the gap between members 15 and 16 to cause a current to flow thru the two wires 17 and 18. This member 22 is adapted to be depressed by pushing a button 24 to close the circuit even though the container support is in lowered position. The other end of member 21 is penetrated by a slidable bolt 25 penetrating the upper portion of base 10 and the head of this bolt holds member 21 on one side and a pin 26 holds member 21 on the other side. On the upper portion of the base around bolt 25 is a compression spring 27 and on top of bolt 25 is threadably secured a nut 28.

Member 11 has a hole 29 therein permitting insertion of bolt 25 into position.

Wires 18 and 76 are encased in suitable tubing 30 which is led thru a hole 31 in hollow vertically disposed standard 32 and thru coinciding opening 33 in the lower end of hollow vertically disposed standard 32 and base portion 10. Base portion 10 and hollow vertically disposed standard 32 are secured to each other by any suitable means such as screws 34. Vertically disposed hollow member 32 has a spider 36 therein serving as a bearing for the lower end of a double threaded shaft 37 having two pairs of oppositely inclined grooves therein for raising and lowering the container support.

Figure 7:
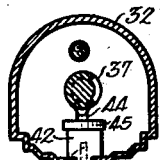
Figure 7 is a cross sectional view taken along the line 7—7 in Figure 2.
Figure 8:
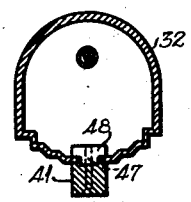
Figure 8 is a cross sectional view taken along the line 8—8 in Figure 2.
Figure 2:
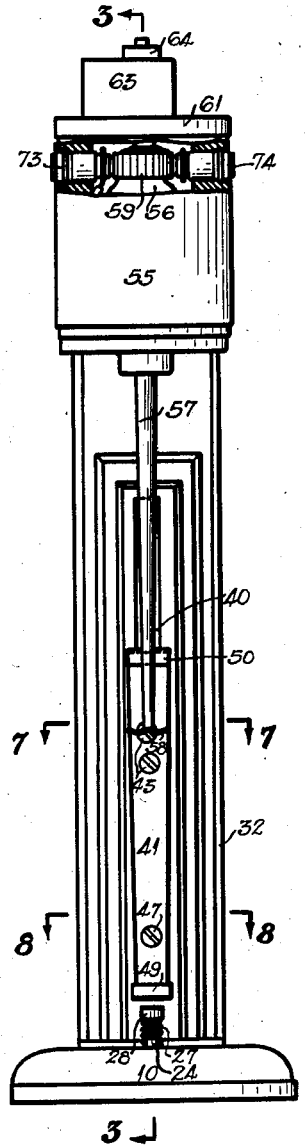
Figure 2 is a front elevation with the upper portion thereof broken away.

Hollow vertically disposed standard 32 has a vertically disposed slot 40 therein in which the support 41 for the drink container, not shown, may be placed. This support 41 has grooved member 42 secured thereto by any suitable means such as screws 43 and a loosely mounted pin member 44 is mounted therein having a collar 45 fixedly secured thereon to form an enlarged bearing surface for pin 44. The tip of pin 44 is adapted to engage the double set of grooves in shaft 37. By referring to Figure 7, the structure is more clearly shown.

The lower end of support 41 is penetrated by a screw 47 which also penetrates a grooved lug 48 which serves as a lower guide for the container support 41. The lower end of container support 41 has a projecting portion 49 thereon which is adapted to engage nut 28 on bolt 25 to open the switch composed of member 23 and members 15 and 16 when the container support with the container thereon is lowered to lowermost position which automatically stops the motor. The upper end of container support 41 has a hooked member 50 secured thereon and projecting slightly from the support 41 and beneath this hook 50 and upper rim of the drink container is adapted to be inserted to hold the drink container in position.

The upper end of hollow vertically disposed standard 32 has a motor housing 55 integral therewith in which a conventional electric motor is housed and in the form shown the stationary windings of the motor are encased in housing 55, whereas, armature 56 has integral therewith motor shaft 57, and the lower end thereof forms an agitator shaft having an agitator 58 on the lower end thereof.

The upper end of motor shaft has a commutator 59 mounted thereon. Disposed immediately above commutator 59 is a bearing 60 disposed in housing 61 which is adapted to be secured to housing 55 and to hollow vertically disposed standard 32 by any suitable means such as a plurality of screws 62. The upper end of motor shaft 57 projects into an enlarged portion 63 and has fixedly secured thereon a worm 64 which is adapted to engage a gear 65 fixedly secured on shaft 66 and the other end of this shaft is suitably mounted in a projection 67 and has a worm 68 meshing with a gear 69 secured on the upper end of shaft 37.

The upper end of shaft 37 is rotatably mounted in bearing portion 70 formed in casing 61. Integral with projection 63 is a bearing portion 63a which also serves as a bearing for shaft 66.

Wire 18 passing thru tube 30 and to member 15 forms one side of a circuit, whereas, wire 17 secured to member 16 extends upwardly thru tubing 72.

As is conventional in electric motors, there is a starting circuit and an operating circuit which is not shown in the drawings for the reason that it is conventional.

Wire 17 is forked into leads 17a and 17b, 17a being connected to one side of the starting coils of the motor and 17b being connected to one side of the operating coils of the motor. Wire 17c leads from the starting coil and is connected to wire 17d. Whereas, the operating coils are connected by wire 17e to wire 17d also and wire 17d is connected to brush 73 of the motor. Whereas, wire 76 leads from brush 74 back thru tubing 72 and thru tubing 30 where it emerges and is connected to the other side of the source of electrical energy to which wire 18 is connected. It is of course understood that current goes thru either the starting coils or the opering coils, as a suitable mechanism such as a centrifugal switch is provided for cutting out the starting coils and throwing into operation the operating coils after the motor has attained the proper speed.

The descripion of the motor and the wiring therefor is conventional and no further description of the same is deemed to be necessary.

Figure 3:
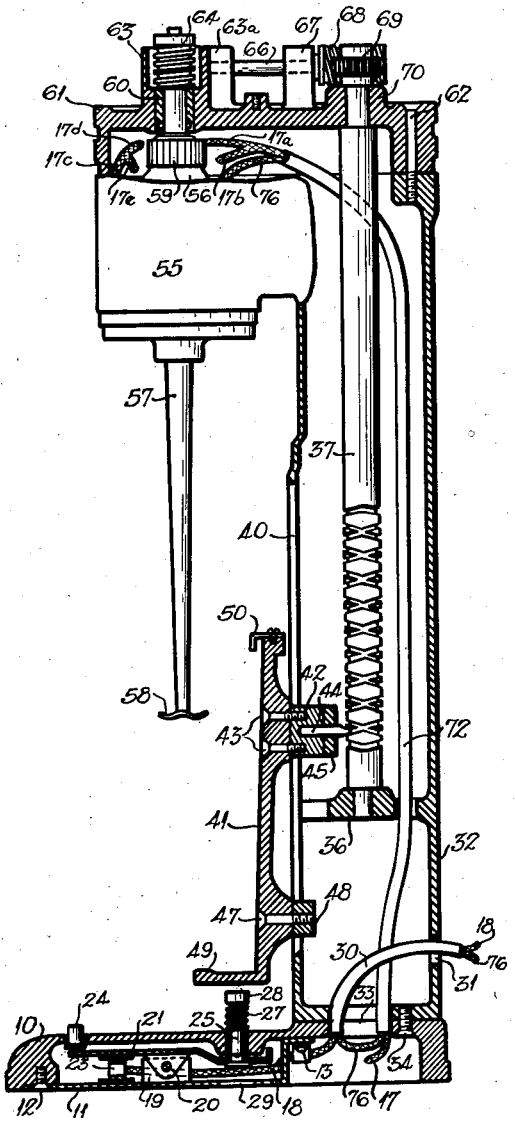
Figure 3 is a vertical sectional view taken along the line 3—3 in Figure 2, and showing portions thereof in elevation.
Figure 9:
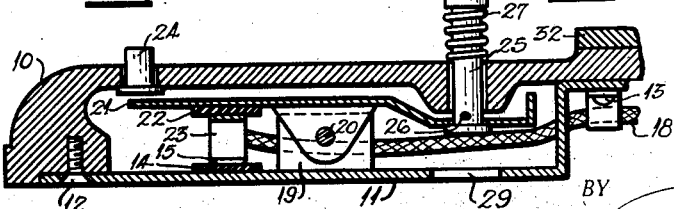
Figure 9 is a sectional view showing the left lower portion of Figure 3 on an enlarged scale.

The operation of the drink mixer is as follows:

A suitable container, not shown, filled with a drink to be mixed or other material to be mixed is first inserted in position, having the rim of the container inserted beneath the hook member 50 and the bottom of the container rests on projection 49. In this position, of course, the support is in lowered position to a slightly greater degree than shown in the drawings. In other words, pin 44 is in the lowermost portion of the grooves on shaft 37 and in this position bolt 25 is pressed downwardly to cause the right hand end of member 24 as shown in Figures 3 and 9 to be in lowered position, thus raising the left hand end and opening the switch composed of members 23, 15 and 16. When the container is thus placed in position, the motor will not start for the reason that the circuit is open, but by pressure on button 24, the left hand end of member 21 as shown in Figures 3 and 9 is pressed downwardly on account of the fact that member 21 is of resilient material such as a leaf spring.

This closes the circuit and starts the motor in operation which immediately starts the container support with the container hereon upwardly and tension spring 27 causes bolt 25 to assume the position shown in Figures 3 and 9 and the circuit is thus held closed and the pin 44 follows its groove upwardly until it reaches uppermost position at which time the pin 44 is automatically directed downwardly in the other groove on shaft 37 until the container support with the container thereon reaches its lowermost position at which time projection 49 engages nut 28 on the upper end of bolt 25 and presses bolt 25 downwardly against the pressure of spring 27 and switch composed of members 15, 16 and 23 is opened and the motor is automatically stopped and the container with the mixed drink therein can be taken from the support if desired. It is thus seen that a drink mixer has been provided in which the container with the drink therein can be placed in position and a button pressed to start the mixing operation and the timing of the gears is such as to cause the drink to be mixed properly by first raising the drink container upwardly with relation to the shaft 57 and agitator 58 and then lowering the drink and thus it is seen that as the drink is lowered and agitator 56 approaches a position near the top of the level of the drink, the drink will be aerated and caused to assume a foamy, fluffy condition which is very desirable in the drink mixing art.

It is also evident that the drink in the container will be of such quantity to cause the agitator 58 to be clear of the drink for a short time before support 41 reaches its lowermost position which will cause the agitator 58 to throw therefrom, by centrifugal force, particles of the drink which may remain thereon and thus automatically clean the agitator 58 before the motor is stopped.

In the drawings and specification, there has been set forth a preferred embodiment of the invention, and although specific terms are employed, they are used in a generic and descriptive sense only and not for purposes of limitation, the scope of the invention being set forth in the appended claims.

I claim:

1. A mixer comprising a standard, an electric motor supported in the standard, a circuit for said motor, a rotating agitating arm on the motor, a container support movably mounted on the standard, a rotatable shaft mounted in the standard and having two sets of oppositely disposed threads thereon, means on the container support operatively engaging said threads, means operatively associated with the upper end of the shaft and with said motor for raising and lowering said support with relation to the agitator, a switch in said circuit normally held in open position by said support, manually operable means independent of the said support and said container for closing said switch in said circuit, and means operable by the container support for opening said switch in said circuit.

2. In a drink mixer having a base member, a vertically disposed hollow standard mounted on the base member, an electric motor mounted on the upper portion of said standard and having a downwardly projecting agitator shaft driven thereby, a container support mounted for vertical movement up and down said standard, a vertically disposed shaft mounted in said standard and having two sets of oppositely inclined threads thereon, a series of reducing gears disposed between said motor and said vertically disposed shaft for driving the shaft, means on the container support for engaging said threads on said shaft, a circuit for said motor, a switch in said base member normally held in open position by said support controlling said circuit, manually operable means independent of the container support for closing said switch to start the motor and means engageable by the container support for opening said switch and stopping the motor when the container support is lowered to its lowermost position.

3. A drink mixer comprising a standard, an electric motor supported in the standard, a circuit for said motor, an agitator adapted to be driven by said motor, a rotatable shaft having two sets of oppositely disposed threads thereon, mounted in said standard and being driven by said motor, a container, a container support mounted for vertical movement on said standard and normally positioned in its lowermost position, means carried by said support for operatively engaging said shaft, a switch in said circuit adapted to be moved to open position by said support when the support is in its lowermost position and manual means independent of said support for closing said switch.

4. A drink mixer having a hollow vertically disposed standard, an electric motor mounted on the upper end of the standard and being laterally disposed from the upper end of the standard, a base secured to and projecting laterally from the lower end of the standard, a shaft rotatably mounted within the standard and having two sets of threads thereon, one being in the reverse direction to the other set, operative connections between the motor and the upper end of the shaft for imparting rotary movement to the shaft, an agitator secured to and driven by the motor and projecting downwardly toward the base, said standard having a vertically disposed slot therein, a container support mounted for vertical sliding movement in the slot, said support having means thereon for engaging said threads in said shaft, said support also having a laterally disposed portion on which a container support is adapted to be supported, rotation of the shaft being adapted to raise and then lower the container support, a circuit connected to said electric motor for supplying electrical energy thereto, a switch in said circuit and located in said base and having means engageable by said container support for holding the switch in open position when the support is in its lowermost position and manually operated means for closing said switch while the support is in its lowermost position to start the motor to raise and lower the support.

WILLIAM A. STROUD.